No. 828,337. PATENTED AUG. 14, 1906.
A. E. PUTNAM.
ROLLER BEARING.
APPLICATION FILED NOV. 21, 1905.

2 SHEETS—SHEET 1.

Witnesses
Inventor
A. E. Putnam,
By Wilkinson & Fisher.
Attorneys

No. 828,337. PATENTED AUG. 14, 1906.
A. E. PUTNAM.
ROLLER BEARING.
APPLICATION FILED NOV. 21, 1905.
2 SHEETS—SHEET 2.
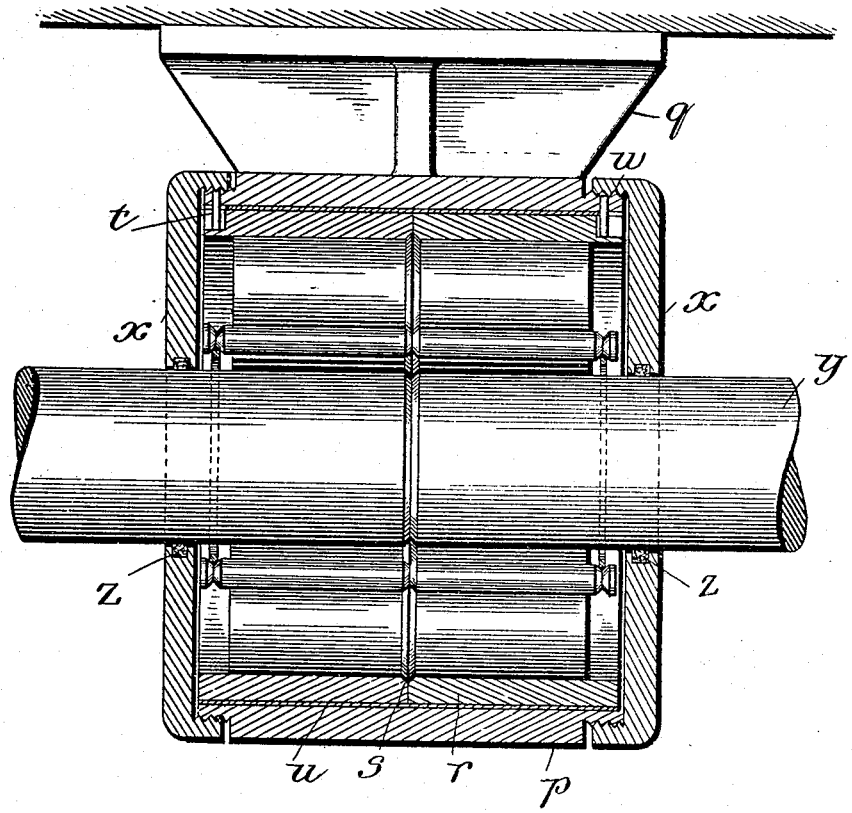
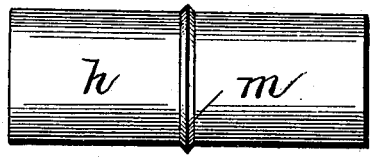 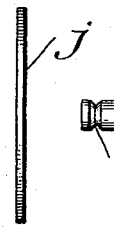 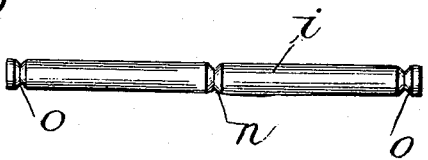
Witnesses
Geo. H. Pepiel
W. May Durall
Inventor
A. E. Putnam,
By Wilkinson & Fisher.
Attorneys

UNITED STATES PATENT OFFICE.

ALFRED E. PUTNAM, OF SANTA BARBARA, CALIFORNIA.

ROLLER-BEARING.

No. 828,337. Specification of Letters Patent. Patented Aug. 14, 1906.

Application filed November 21, 1905. Serial No. 288,479.

*To all whom it may concern:*

Be it known that I, ALFRED EUGENE PUTNAM, a citizen of the United States, residing at Santa Barbara, in the county of Santa Barbara and State of California, have invented certain new and useful Improvements in Roller-Bearings; and I do hereby declare the following to be a full, clear, and exact description of the invention, such as will enable others skilled in the art to which it appertains to make and use the same.

My invention relates to improvements in roller-bearings; and the object of my invention is to provide a device of this class which will not require lubrication, which is very simple and economical in construction, and which totally eliminates sliding friction, whereby there is produced a bearing capable of carrying any weight at any speed with no adverse motion and no harmful effect between any of its parts or upon the same as a whole, whereby the power needed to propel the vehicle or machinery is greatly reduced, and nuts and shoulders upon the axle or shafting and end friction may be dispensed with.

With these objects in view my invention consists in the construction and combinations of parts, as hereinafter described and claimed.

In the accompanying drawings, Figure 1 represents a cross-section of the hub of a vehicle, showing my improvement applied thereto. Fig. 2 shows an end view of the same, the end cap being removed and the axle shown in section. Figs. 3 and 4 are detail views illustrating specific features of construction. Fig. 5 is a cross-section of a modified form of my invention, showing it as applied to a shaft-hanger; and Figs. 6, 7, and 8 illustrate details of the bearing.

My invention is capable of general application in all instances wherein parts are caused to rotate upon an axle or wherein shafts are caused to rotate in stationary journals.

Referring to Figs. 1 to 4, $a$ represents a vehicle-axle, on which is mounted a hub $b$, provided with the usual spokes. The interior of the hub $b$ is screw-threaded, and engaging with this screw-threaded portion is an externally-screw-threaded roller-casing, composed of two halves $c$ and $d$, similar in shape. These two parts are screwed into the hub until their inner edges meet or contact with the shoulders of the primary rollers, as shown in Fig. 4, said edges being beveled off, so that they form an internal V-shaped annular groove, with which projections on the large or primary rollers engage. In assembling the parts the two halves of the roller-casing need not be screwed completely home, but only near enough so that the shoulders of the projection and the groove will meet, as shown in Fig. 4, permitting easy and free operation and providing means for adjustment in case of wear and at the same time preventing longitudinal movement of said rollers. The outer edges of the parts $c$ and $d$ are cut away, as shown at $e$, forming spanner-holes for the reception of a wrench. On each end of the roller-casing is a cap-nut, such as $f$, which is adapted to screw down against the hub $b$. The said end cap may, however, be secured upon or fastened to the hub, if desired, instead of the roller-casing. A dust-excluding washer or packing $g$, of leather, felt, or other suitable material, is used with the cap-nut, through which the shaft $a$ projects, said dust-excluding washer or packing to be held in position and equal circular contact with the axle or shaft by either gluing or otherwise fastening the same to the cap-nut through which the axle or shaft projects, by employing a metal, wooden, or other hard-substanced washer of a size sufficient to be fitted within and be screwed or otherwise attached to the interior of said cap-nut. The said cap-nuts each are to be provided at the outer circumference with two or more openings 2 of sufficient size and depth into the rim of said nuts, so as to serve on a rounded cap-nut as the holder for a spanner in screwing the same into place, and at least one of said openings may be extended with a smaller passage through the same rim of those cap-nuts having dust-excluding washers or packing for the introduction of any lubricating-oil into the same, where it may be absorbed and gradually apply itself at the point of contact with axle or shaft, if desired, to reduce the friction and wear thereat, the said oil-introducing passage to be closed by a screw-plug 4, introduced at its outer end within and at the bottom of the spanner-opening, as shown in Fig. 1. The cap-nuts also may be provided with the air-holes in the form shown in Fig. 1 filled with some suitable porous material, which will permit the passage of air into and to circulate through the bearings, changing the air sufficiently to maintain a normal and even temperature therein, but excluding dust. This porous material is kept in place by perforated screw-caps 5 or in any suitable manner. The outside end of these screw-caps 5 may be provided with half-circular scoop-like concave tips or funnel-shaped air-catchers 6, so attached thereto and adjustable thereon and sufficiently projecting beyond the surface of the cap-nut that when facing on one side in the direction of a revolving wheel and on the opposite side the reverse way an air-current is caused to course through the bearing in the ratio of the number and resistance of the dust-washers placed in the air-holes and the power gained with the rate of speed attained, thus assuring and ever maintaining an even and non-heating temperature within this bearing. Instead of the porous substance in the holes 3 there may be used as many rings as desired or will go therein, upon which is stretched and secured silk cloth or other material most suitable for most freely admitting the passage of air through, while excluding dust from the bearing. Spacing-washers may be used between said rings as found desirable. These air-catchers 6 may be arranged as shown on the drawings or located in any desired position on the cap-nuts $f$. Between the roller-casing and the axle $a$ are a series of large or primary rollers $h$, which contact with the interior of the roller-casing and with the axle. Between the large or primary rollers $h$ are a series of smaller or spacing rollers $i$. These rollers $i$ lie between and just within the narrowest space separating the rollers $h$. The rollers $i$ are kept in contact with the rollers $h$ and free from the axle by the rings $j$, one located near each end of the rollers $i$. These rings may be either spring-rings continuously expanding outwardly against and keeping the said rollers $j$ in firm contact with the primary rollers, which is the preferable form, or solid rings, or in case where the axle does not pass through the bearing a disk may be used. The axle $a$ is provided with a V-shaped annular groove $k$, located in about the center of the roller-bearing and opposite to the groove $l$, formed between the two parts $c$ and $d$ of the roller-casing. Each of the primary rollers $h$ is provided with a V-shaped circular projection $m$, which is adapted to fit within the grooves $k$ and $l$. It does not exactly fit in said groove, however, the arrangement being such as shown in Fig. 4, so that all side friction and variations in speed are avoided and the greatest side-bearing strength being given on said rollers. The spacing-rollers $i$ are provided with similar V-shaped grooves $n$, these grooves being also of greater depth than the projections $m$ on the rollers $h$ for the reasons given above, by which the same are held longitudinally in place with the primary rollers. Each end of the spacing-rollers $i$ is provided with a V-shaped annular groove $o$, with which the spacing-ring $j$ engages. These rings $j$ are preferably made square in cross-section, fitting within the groove $o$ in the manner shown in Fig. 3, so as to have no side play or friction in operative contact with the side rollers. If desired, however, said rings may be constructed with V-shaped projections, such as shown on the primary roller in Fig. 4, which contact and operate in the same way in the V-shaped depressions $o$ in the spacing-rollers.

In Figs. 5 to 8 a modified form of my device is shown, in which a revolving shaft is mounted in a stationary shaft-hanger or bearing, to which my invention is applied. $p$ represents the hanger-casing supported by a bracket $q$ in the usual manner. Within this is mounted the annular roller-casing $r$, made in two parts and provided with the central internal V-shaped groove $s$, already described. In the construction shown in Fig. 5 the roller-casing $r$ has a smooth outside and is slipped within the hanger-casing $p$, being kept in place by pins $t$, which can pass into longitudinal slots in the roller-casing $r$. As described in connection with Fig. 1, the two halves of the roller-casing shown in Fig. 5 are adjustable in relation to each other, such adjustment being effected by screwing up the cap-nuts $x$. To prevent rattling and acting as a non-sounding board, a layer or casing $u$, of rawhide or other suitable non-metallic substance, is placed between the casings $p$ and $r$. The outer ends of the casing $p$ are screw-threaded, as shown at $w$, and cap-nuts $x$ engage with this screw-threaded portion, completely closing the bearing, except where the shaft $y$ passes therethrough. When the cap-nuts $x$ are screwed home, the pins $t$, the roller-casing $r$, and the layer $u$ are all held in their proper adjusted positions. Each of the cap-nuts $x$ is provided with an internal groove $z$, in which is located a strip of felt or other dust-excluding material, which may be used interchangeably in place of the form shown in Fig. 1 for dust exclusion. This strip sufficiently projects beyond the edges of the said cap-nuts so as to contact with the shaft, the cap-nuts $x$ not touching the shaft. The rollers $h$, provided with the projections $m$, the rings $j$, and the spacing-rollers $i$, provided with the grooves $n$ and $o$, are similar to those already described in connection with Figs. 1 to 4.

In Figs. 1 and 5 I have shown different modifications; but I wish it to be understood that the features can be alternately used in either construction. For example, the layer of non-metallic material, such as $u$, might be used in connection with the hub of a vehicle-wheel, as shown in Fig. 1, or the screw-threaded construction, as shown in Fig. 1, could be used in connection with the shaft-hanger. In fact, my invention is of general application where two bodies rotate in contact with each other.

In order to utilize the non-metallic and non-sounding casing used in Fig. 5 in wheel construction shown in Fig. 1, I purpose to employ an extra detachable casing screw-threaded interiorly, so as to receive the roller-casing, as in Fig. 1, and exterior to all of which I place said non-metallic casing, holding all in place within the hub of the wheel by employing the pins and screw-caps thereon in the manner set forth in Fig. 5, thus holding the combination in place in the hubs or wheels as securely as is accomplished by the methods employed in Fig. 1. Furthermore, instead of employing the V-shaped projection on the primary roller, as shown in Fig. 4, I may use a square projection, in which case the bearing would be similar to that illustrated in Fig. 3.

The parts of my device shown in Figs. 1 and 2 are assembled and combined as follows: The beveled end of one part of the roller-casing is inserted into its inclosing casing from the vehicle end of the hub and screwed into its position therein, its cap-nut is then screwed into place thereon, and the whole slipped over the axle past the space used for assembling the roller parts, followed by one of the supporting-rings j. The primary rollers are then grouped around the axle, with their projections fitting into their corresponding groove thereon and temporarily held in position by rubber bands around the ends thereof, while the spacing-rollers are slipped into place between them upon their said supporting-rings. The beveled end of the other part of the roller-casing is thereupon pushed over the end of the axle and said rollers until it comes into contact with said primary-roller projections. As assembled, the uncased end of the rollers is then introduced into the outside part of the hub and the roller-casing screwed into the same until the projections on that side of the primary rollers meet the beveled end of the roller-casing therein. The end cap-nut is then screwed into place, thus combining all into operative position. The bearing may be partially or wholly disassembled by reversing these steps. The order of combining as described above can be as readily reversed or changed, so as to meet the needs of construction of the vehicle or parts it is to serve.

The form and parts of my device shown in Figs. 5 to 8 are assembled and combined in a similar manner to those shown in Fig. 1, modified to introduce extra parts thereof and to meet the difference in application and environment of the bearing.

One of the especial and distinctive features of my invention is the divided or halved roller-casing, as herein shown, which provides the primary and additional means and advantages needed for easily and quickly assembling and introducing of the parts of any roller-bearing into place in a hub of a wheel or shafting box and effectually combining and holding of the same in their operative combination in a manner so as to do away entirely with the need and use of end nuts and shoulders upon the axle or shaft and all friction caused by the means provided for keeping the bearing in position thereon.

Having thus described my invention, what I claim as new, and desire to secure by Letters Patent, is—

1. In a roller-bearing, the combination of an inclosing casing, a divided roller-casing therein, the parts of said roller-casing being cut away at their meeting-point to form an annular groove, a shaft or axle provided with a corresponding annular groove, primary rollers, provided with projections, located between said shaft or axle and said roller-casing, said projections entering into and contacting with the edges of said grooves, spacing-rollers lying between and just within the narrowest space separating said primary rollers, and means separate from said shaft and axle for pressing out said spacing-rollers into contact with said primary rollers, substantially as described.

2. In a roller-bearing, the combination of an inclosing casing, a roller-casing secured therein and composed of two parts, said parts being cut away at their meeting edge to form a groove, a shaft or axle provided with a corresponding groove, large primary rollers contacting with said shaft or axle and with said roller-casing, each provided with a projection adapted to engage said grooves at their edges only, and smaller secondary or spacing rollers each provided with a groove corresponding with the grooves on the shaft or axle and the roller-casing, said spacing-rollers lying between and just within the narrowest space separating the primary rollers, and a ring engaging each end of said spacing-rollers, said rings being disconnected from the rest of the bearing members, and said spacing-rollers contacting only with said primary rollers and said rings, substantially as described.

3. In a roller-bearing, the combination of an inclosing casing, a shaft or axle therein provided with a V-shaped annular groove, a divided roller-casing in said first-named casing provided with a V-shaped annular groove, primary rollers contacting with said shaft or axle and said roller-casing, each of said primary rollers being provided with a V-shaped projection adapted to fit within and contact with the edges of the grooves in said roller-casing, and said shaft or axle, but made at a more obtuse angle, spacing-rollers provided with V-shaped grooves located one in contact with each of two of said primary rollers, and lying between and just within the narrowest space separating said primary rollers, and means disconnected from the other parts of the bearing for holding said spacing-rollers in contact with the primary rollers, said spacing-rollers contacting only with said primary rollers, and with said means, substantially as described.

4. In a roller-bearing, the combination of an inclosing casing, a divided roller-casing secured therein, the meeting edges of the parts of said roller-casing being cut away so as to form a V-shaped annular groove, a shaft or axle provided with a V-shaped annular groove corresponding in location to said first-named groove, primary rollers contacting with said roller-casing and said shaft or axle, each provided with a V-shaped projection adapted to enter into and contact with the edges only of said grooves, but made at a more obtuse angle than said grooves, spacing-rollers located one in contact with each of two adjacent primary rollers and lying between and just within the narrowest space separating said primary rollers, and provided with a V-shaped central groove and with a V-shaped groove near each end, and a ring separated from said shaft or axle contacting with the end of said spacing-rollers and holding them in contact with said primary rollers, said spacing-rollers contacting only with said rings and said primary rollers, substantially as described.

5. In a roller-bearing, the combination of an inclosing casing, a divided roller-casing therein, the meeting edges of said roller-casing being cut away so as to provide an annular groove, a non-sounding casing located between said casings, the three casings being secured together, a shaft or axle provided with an annular groove, primary rollers each provided with a projection fitting in the grooves in said shaft or axle and said roller-casing and contacting with the edges thereof only, spacing-rollers located one between two adjacent primary rollers and lying between and just within the narrowest space separating said primary rollers, means separate from said shaft or axle for holding said spacing-rollers in contact with said primary rollers, and end cap-nuts, substantially as described.

6. In a roller-bearing, the combination of an inclosing casing, a divided roller-casing therein, the meeting edges of said roller-casing being cut away so as to provide an annular groove, a non-sounding casing located between said casings, the three casings being secured together, a shaft or axle provided with an annular groove, primary rollers each provided with a projection fitting in the grooves in said shaft or axle and said roller-casing, and contacting with the edges thereof only, spacing-rollers located one between two adjacent primary rollers, and lying between and just within the narrowest space separating said primary rollers, means separate from said shaft or axle for holding said spacing-rollers in contact with said primary rollers, cap-nuts and dust-excluding devices, substantially as described.

7. In a roller-bearing, the combination of an inclosing casing screw-threaded at its outer ends, a non-sounding casing within said first-named casing, and a divided roller-casing within said second-named casing, said roller-casing being made in two parts, said parts having their meeting edges beveled to form a V-shaped groove, pins for securing said three casings together, a shaft or axle provided with a V-shaped groove, primary rollers contacting with said shaft or axle and said roller-casing, each of said rollers being provided with a projection adapted to engage within the groove in said shaft or axle and said roller-casing, and contacting only with the edges of said grooves, spacing-rollers located one between two adjacent primary rollers and lying between and just within the narrowest space separating said rollers, rings separate from said shaft or axle and holding said spacing-rollers in contact with said primary rollers, and cap-nuts adapted to screw onto the ends of said first-named casing, substantially as described.

8. In a roller-bearing, the combination of an inclosing casing screw-threaded at its outer ends, a non-metallic non-sounding casing within said first-named casing, a divided roller-casing within said second-named casing, said roller-casing being composed of two halves, the meeting edges of which are beveled off to form a V-shaped internal groove, pins for securing said three casings together, a shaft or axle provided with a V-shaped annular groove, corresponding in location to the groove on said roller-casing, primary rollers each provided with V-shaped projections engaging within the grooves in the shaft or axle and the roller-casing, contacting only with the edges of said grooves, spacing-rollers in contact with said primary rollers and located just within the narrowest portion of the space between said primary rollers, said spacing-rollers being each provided with a central V-shaped groove, to centrally engage the projections on the primary rollers, and with a V-shaped groove at each end, rings engaging the grooves on each end of said rollers, said rings contacting only with said spacing-rollers, and cap-nuts with dust-excluding devices secured to said first-named casing, substantially as described.

9. In a roller-bearing, the combination of a shaft or axle, a casing, primary rollers located between said shaft or axle and said casing and contacting therewith, spacing-rollers lying between the primary rollers and nearer the shaft or axle than the narrowest portion of the space separating said primary rollers, said narrowest space being less in width than the diameter of each of the spacing-rollers, and means contacting only with said spacing-rollers for pressing them out and holding them in contact with said primary rollers, substantially as described.

10. In a roller-bearing, the combination of an outside casing, an axle or shaft, and rollers, having centrally-located projections thereon, with a two-part divided roller-casing composed of two hollow cylinders of similar size and shape adapted to be secured within the outer casing, each half of said roller-casing having its meeting edge beveled off so as to form when assembled in operative position an interior groove, said roller-casing being of any desired length and externally contacting and engaging the whole length of each primary roller each way from the projection thereon, substantially as described.

11. In a roller-bearing, the combination of an outer casing, a divided roller-casing inclosed therein, the parts of said roller-casing forming when in the operative position an annular groove, a shaft or axle provided with a corresponding annular groove, primary rollers provided with projections located between said shaft or axle and said roller-casing, said projections entering into said grooves in said roller-casing and in said shaft or axle, respectively, spacing-rollers lying within the narrowest space separating said primary rollers and said shaft or axle, and means separate from said shaft or axle for holding said spacing-rollers in contact with said primary rollers, substantially as described.

12. In a roller-bearing, the combination of a shaft or axle, a casing, primary rollers located between said shaft or axle and said casing and contacting with said casing and said shaft or axle, spacing-rollers lying between the primary rollers and located inside of the circle joining the centers of the primary rollers, and a ring surrounding said shaft or axle and pressing said spacing-rollers outward into engagement with said primary rollers, substantially as described.

13. In a roller-bearing, the combination of a shaft or axle, a casing, primary rollers located between said shaft or axle and said casing and contacting with said casing and said shaft or axle, spacing-rollers lying between the primary rollers, and each spacing-roller having its axis lying inside of the plane joining the axes of the two adjacent primary rollers, and means surrounding said shaft or axle and pressing said spacing-rollers outward into engagement with said primary rollers, substantially as described.

14. In a roller-bearing, the combination of an outer casing, a two-part cylindrical roller-casing adjustable therein to form a circular groove, a shaft or axle provided with a corresponding groove, primary rollers provided with circumferential projections engaging said groove in the casing and in the shaft or axle, spacing-rollers provided with a corresponding groove also engaging said projections of the primary rollers and keeping separate said primary rollers, each spacing-roller having its axis inside of the plane joining the axis of the two adjacent primary rollers, and each spacing-roller being provided with grooves near its ends, and ring-tracks surrounding and free from said shaft or axle and engaging said grooves in the ends of the spacing-rollers pressing said spacing-rollers outward into engagement with said primary rollers, substantially as described.

In testimony whereof I affix my signature in presence of two witnesses.

ALFRED E. PUTNAM.

Witnesses:
J. FRED. KELLEY,
E. W. HOLMES.